Aug. 5, 1930. G. L. BROOKE-HUNT ET AL 1,772,414
SHOCK ABSORBER, RESILIENT SUSPENSION MEANS, AND THE LIKE
Filed Nov. 11, 1929 3 Sheets-Sheet 2

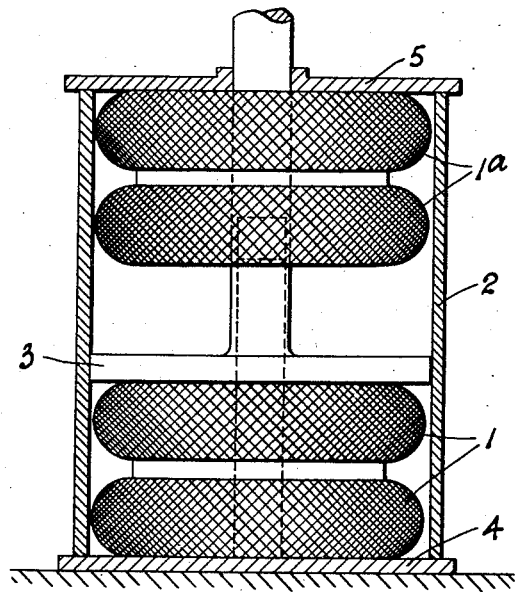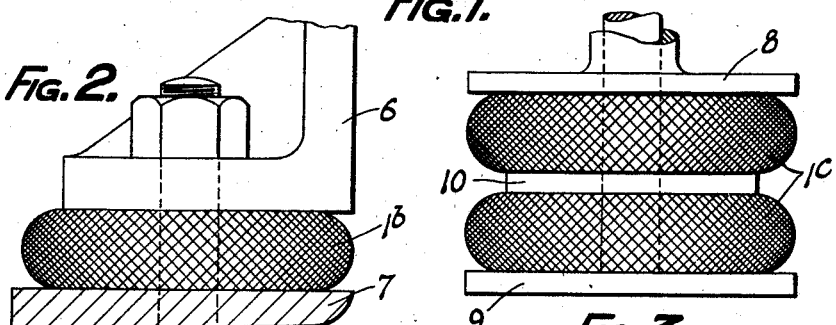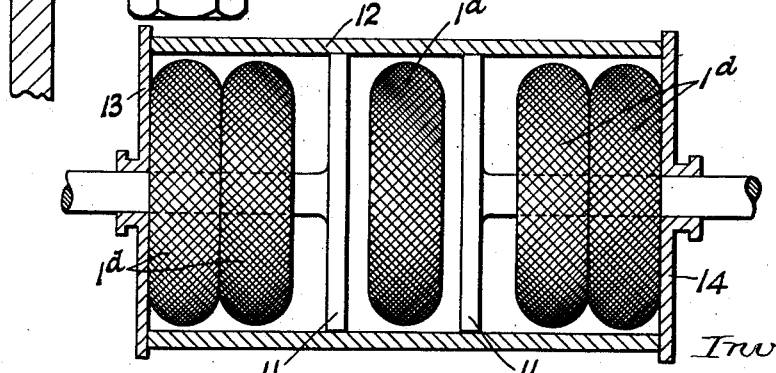

Inventors
Godfrey Leveson Brooke-Hunt
Leonard Rowland
by Connolly Bros.
Attys

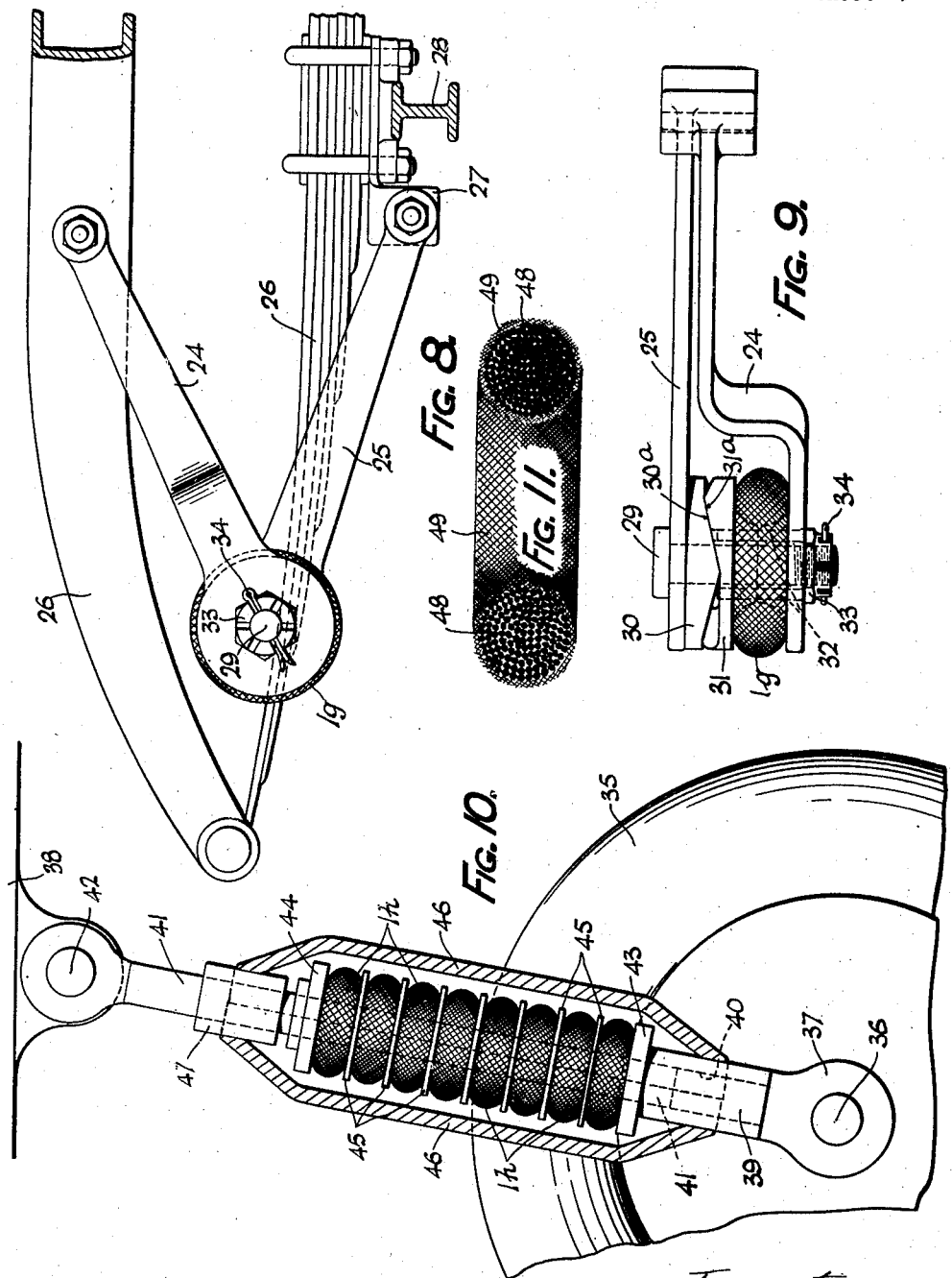

Patented Aug. 5, 1930

1,772,414

UNITED STATES PATENT OFFICE

GODFREY LEVESON BROOKE-HUNT AND LEONARD ROWLAND, OF LEICESTER, ENGLAND

SHOCK ABSORBER, RESILIENT SUSPENSION MEANS, AND THE LIKE

Application filed November 11, 1929, Serial No. 406,358, and in Great Britain July 13, 1928.

This invention relates to shock absorbers, resilient suspension means and the like and has reference to means of this kind wherein india-rubber constitutes the elastic or resilient medium.

In order that the invention may be clearly understood, practical applications thereof are represented in the accompanying drawings to which reference will be made describing the invention in detail.

In the drawings

Figure 1 shows one form of shock absorber adapted to take rebound as well as impulsive load, Figure 2 shows a covered shock absorber ring serving as a cushion between opposing parts, hereinafter more particularly referred to.

Figure 3 shows covered shock absorber rings arranged to insulate two relatively movable parts from shock.

Figure 4 shows another arrangement employing rings arranged to take impulsive loads and rebound.

Figure 8 is a side elevation of a rebound snubber embodying the principle of the invention for application to a motor vehicle.

Figure 9 is a plan view of the snubber shown in Figure 8.

Figure 10 illustrates an application of the invention to the undercarriage or landing gear of an aeroplane, and Figure 11 is a cross-sectional elevation of a covered shock absorbing ring per se.

Figure 5:
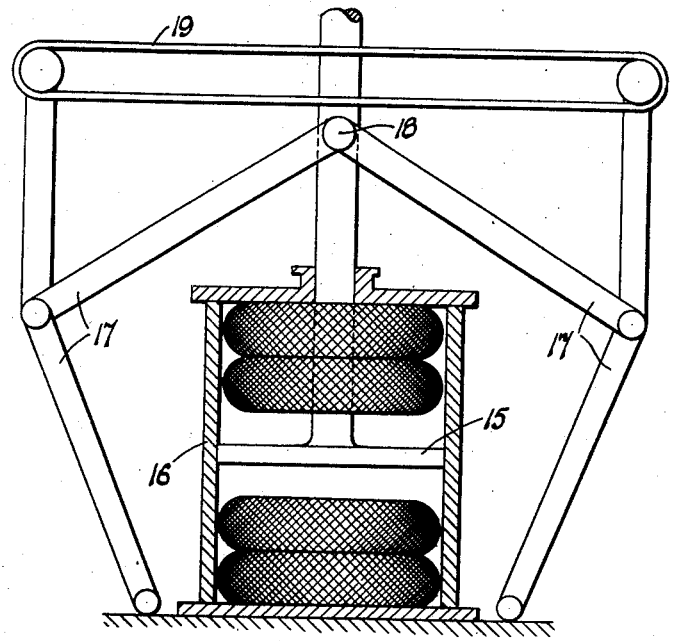
Figure 5 shows a form of shock absorber employing covered shock absorber rings in compression together with elastic tension means.

The invention concerns elastic or resilient devices or means, for example shock absorber rings and cords, in which a core of rubber is covered with a textile or other binding medium.

Heretofore, covered shock absorber rings, cords and the like have been used in tension. The principal feature of this invention is that such means are used in compression.

We have found by experiment that shock absorbing material of the kind comprising a rubber core covered with a binding medium is decidedly advantageous when used in compression instead of tension. Not only is the hysteresis greater but the fatigue to which rubber is subject when under tension is much reduced when rubber is used under compression. We believe that by employing a covered core of rubber under compression instead of under tension the fullest possible advantage can be taken of those peculiar physical properties of rubber which render it particularly applicable for shock absorbing and like purposes.

It may be here stated that while this invention concerns primarily an elastic body or material wherein the covered core is composed of a multiplicity or plurality of rubber strands or threads, it is not by any means limited in this respect as it is applicable also to elastic bodies or materials wherein the covered rubber core is otherwise constituted as for example solid i. e. a single member.

The advantage of a multi-strand rubber core is that increased strength is provided and capacity for given loads can be more readily determined, and, in the case of endless rings, manufacture is simplified to a considerable extent than is the case where a solid rubber core is used.

We are, of course, well aware that the use of uncovered rubber in the form of rings, washers, blocks and other shapes is quite common for shock absorbing purposes and we desire it to be understood that our invention has no concern with the use of rubber in this form. The important characteristic of the present invention is the application of covered rubber in compression for shock absorbing, resilient suspension, damping, cushioning and analogous purposes.

The main advantages of using a covered rubber covered core are that, by reason of the binding effect of the cover, the expansion or distortion of the core can be controlled, and by suitable application of the covering the core can be maintained in an initially tensioned condition. The last mentioned feature is a very useful one since it imparts to the core a higher resistance to compression. Different degrees of compression can be provided for by establishing an appropriate initial stretch of the rubber core within its covering. In addition, therefore, to controlling the expansion or distortion of the core under compression, the covering serves as a binder to prevent the tension of the core falling below a desired initial degree when the ring or cord is in its normal condition.

The covering of the rubber core may vary according to the load, degree of resiliency and other conditions and characteristics to be considered in connection with different applications of the hereindescribed means. For instance, when maximum resiliency of the covered rubber core is a desideratum, the covering may be of an elastic nature e. g. it may consist of rubber such as a sheath, elastic threads or some suitable material capable of stretching to the extent desired. On the other hand where less resiliency is necessary, an inelastic or less elastic covering may be used on the rubber core. We may provide the rubber core with a covering of textile threads (elastic or non-elastic) or of tape or a band, such threads, tape or band being braided, woven, twisted or bound about the core. When tape is used this may be of suitable width and may itself be woven, braided, knitted or otherwise made.

In most cases we find it convenient to use an endless ring having a multi-thread rubber core covered by textile threads or tape braided thereon. A very efficient shock absorbing unit for use in compression can be made by braiding upon a multi-thread rubber core a covering composed of narrow tape, the latter consisting of either woven or braided inelastic threads, e. g. cotton.

The invention however includes as a feature an alternative construction wherein the rubber core is non-tensioned within its covering.

Another feature of the invention is that the covered rubber core may be so formed as to be inextensible when under compression.

While in some cases it may be desirable to use in compression a covered rubber core wherein the latter is initially tensioned to a greater or less degree within its covering, we find that for the purpose of resiliency it is decidedly advantageous that the rubber core should be non-tensioned when in a normal condition. When the rubber core is entirely without tension within its covering it is in the best condition for providing maximum resiliency under compression, and further, the rubber in a core in this condition is much less subject to fatigue than in cases where the core is held by its covering in an initially stretched state.

The desired result is obtained by applying the covering material to the rubber core while the latter is in a relaxed, i. e. non-tensioned, condition.

The aforesaid feature of inextensibility may be obtained by applying the cover in such a manner that it will hold the core from stretching. For instance, a covering consisting of tape or other material may be applied by winding or braiding or some other suitable process, so that the turns or coils thereof overlap and, in conjunction with the tension, prevent the covered core from extending lengthwise when subjected to compression. It is found that a covering consisting for example of strip material can be wound about a rubber core under sufficient tension to prevent the core from stretching lengthwise and yet leave the core in such a condition that it will, when subjected to compression, provide a high percentage of resiliency for shock absorbing or like purposes.

The feature of lengthwise inextensibility is preferably employed in conjunction with the feature of absence of tension on the rubber core, as it is found that a covered rubber core having these two characteristics is eminently suitable for use under compression for shock absorbing and like purposes.

We may, if desired, by suitably applying the covering, make a ring, cord or other body of the kind concerned which is inextensible lengthwise and has the rubber core initially tensioned within the covering. We may also make the article with a rubber core which is normally non-tensioned, said article being capable of lengthwise extension when compressed.

The extensibility or inextensibility of the article in a lengthwise direction and the tensioned or non-tensioned normal condition of the core will depend upon the particular manner in which the article is to be subjected to compression and the purpose for which it is to be compressed. As already stated herein it is preferable that the core should be normally non-tensioned within the covering i. e. not stretched lengthwise beyond its natural relaxed state, and that the article having such core should be inextensible lengthwise. With such an article a high percentage of resiliency is obtainable in compression which renders a covered core of this kind eminently suitable for the purpose intended.

Some practical applications of the invention in the form of shock absorbing devices wherein elastic rings embodying covered rubber cores are employed in compression will now be described, with reference to the accompanying drawings.

In one arrangement shown in Figure 1, rings 1 are combined with a cylinder or like container 2 and are subjected to compression between a piston 3 and the end or bottom 4 of the cylinder. By applying this device so that the piston is attached to one part and the cylinder to another part the said two parts are insulated from shock by compression of the ring or rings under load.

In order to adapt the above described device for taking rebound as well as impulsive load, one or more rings 1ª may be disposed on the opposite side of the piston 3 so that movement in both directions is cushioned by compression of the ring or rings between the piston and cylinder ends 4 and 5.

The invention contemplates the use in compression of covered rubber cores in the form of rings, cords, blocks or other shapes for shock absorbers such as buffers, cushions, pads, bearers, rebound snubbers, combined rebound snubbers and shock absorbers, and so on, also in substitution of or association with spring suspension means such as on road vehicles. The invention may also be advantageously applied for cushioning purposes between the chassis frame and superstructure of motor and other road vehicles, and also between the engine and frame. Figure 2 represents an arrangement of this kind employing a ring 1ᵇ between opposed parts 6 and 7. The part 6 may be a portion of the crank case of an automobile engine and the part 7 may be one of the side members of the chassis frame. Important and advantageous applications of the invention are its use in connection with aeroplanes and motor road vehicles for shock absorbing purposes, as will be hereinafter described.

The covered rubber core in the case of rings and cords takes the compression in a direction transversely to itself during which the covering acts as a binding medium.

The rubber core or cores may be so applied as to be acted upon by opposing members 8 and 9, (see Figure 3) relatively movable, to insulate said members from shock. Either or both of said members may be movable and a single ring, cord or other covered rubber core may be used or two cores 1ᶜ or more may be used together. When a plurality of cores are used these may be separated by a washer or washers such as 10. A development of this application will be more particularly described subsequently herein.

In another arrangement shown in Figure 4, pistons 11, attached or connected to the parts to be insulated from shock, work in a common cylinder 12 or the like and one or more rings 1ᵈ are positioned between the pistons, and between the cylinder ends 13, 14 and pistons. In this case each cylinder or the like may be free or floating. The ring or rings between the pistons 11 take the impulsive load and the others take the rebound, or the latter may take the load and the inner ring or rings the rebound.

Instead of associating one or more rings with a piston and cylinder said ring or rings may be located between relatively movable plates, discs or like parts suitably guided during movement so as to compress the ring or rings, as will be described presently in connection with the application of the invention to a snubber for a motor vehicle.

The invention is not limited as regards the manner in which the one or more rings constituting the resilient medium is or are subjected to compression as it will be understood that the devices, elements or means with which such ring or rings is or are combined for compression purposes may vary in form and arrangement according to the form and disposition of the working parts to be insulated, the amount of relative movement between said parts, the particular damping, cushioning or other effect to be brought about, and other predominating circumstances and conditions.

We may use one or more rings in compression with one or more rings, cord or other elastic or spring means in tension. For instance, as represented in Figure 5, a piston 15 and cylinder 16 may be combined with a toggle arrangement such as 17 moved by connection at 18 with the piston, such movement being controlled by elastic tension means 19, for example, a ring or rings. In this case the elastic tension means may take or assist in taking either load or rebound.

Practical forms of the devices described are suitable for use in road vehicles as shock absorbers or snubbers or as suspension means for bodies and other parts. Principally they are intended for the purpose of insulating motor vehicle bodies and the chassis from the wheels. They may also serve on aeroplanes in connection with the landing gear.

Figure 6:
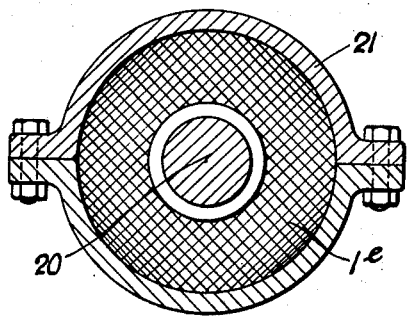
Figure 6 illustrates the use of a covered shock absorber ring in connection with a rod or shaft, as will be hereinafter described.

In a further form one or more rings of the kind concerned may be subjected to compression between opposing members acting upon the inside and outside of the said ring or rings. For instance, as shown in Figure 6, a rod or shaft 20 may be insulated from shock within a tube or cylinder or surrounding bearing or support 21 by an interposed ring 1ᵉ, or rings.

Figure 7:
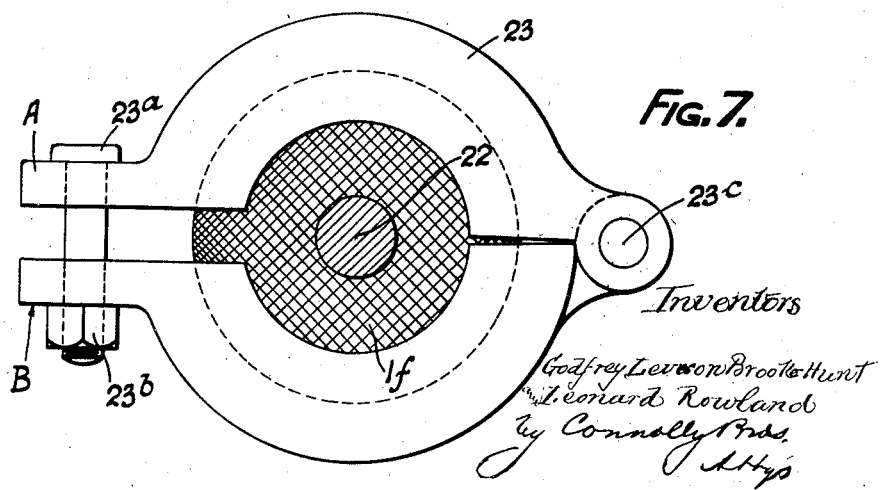
Figure 7 shows a further adaptation of the invention wherein a covered shock absorber ring is arranged for compression radially to absorb shocks.

It is mainly proposed to use covered rings in lateral compression but they may be so applied as to be subject to radial compression. Figure 7 represents a ring 1ᶠ adapted to be subjected to radial compression between a central part 22 and a contractible part 23.

A device of the kind shown in Figure 7 may, for example, be used as a shock absorber on vehicles or for a dropping load. For instance, if the contractible part 23 is fixed at A, a load applied in the arrow direction at B will contract the part 23 and thus the ring 1ᶠ will be compressed about the central part 22 and absorb the load. Or, obviously, the ring 1ᶠ will similarly function as a cushioning element if the member 23 is contracted by a load applied inwardly at both points A and B.

Rebound action of the device just described is limited by the bolt and nut $23^a$, $23^b$ which means may also be employed, by tightening the nut, to contract the member 23 for putting initial compression on the ring $1^f$ if desired. To give ease of contraction, the member 23 is hinged at $23^c$.

A device of the kind shown in Figure 7 can also serve as a resilient bush for shock absorbing or like purposes. For instance if the outer member 23 is held, lateral vibrations or movement of the inner member 22 will be absorbed or cushioned by the intermediate ring $1^f$ which would be compressed radially. Or conversely, if the inner member 22 be held rigid, lateral vibrations or movement of the outer member 23 will be cushioned by the ring $1^f$. In short the ring $1^f$ serves under radial compression as a cushion between the parts 22, 23 to absorb lateral vibrations or movement of either or both said parts.

As hereinbefore mentioned, an important and advantageous application of the invention is its use in connection with motor vehicles for shock absorbing purposes. For example, in Figures 8 and 9 is shown a rebound snubber or cushioning device which comprises a pair of arms or levers 24 and 25, the arm 24 being adapted for attachment to the frame 26 while the arm 25 is attached to a bracket 27 carried by the front axle 28. The arms or levers are articulated by a stud or short axle 29, which may be fast in one arm and free in the other, or it may be free in both arms, that is to say, one or both arms can turn on the stud or axle.

The arm or lever 25 has upon it a boss 30 having facial inclines $30^a$ or cams which engage with corresponding inclines $31^a$ on an adjacent and opposing disc or collar 31 on the stud or axle 29, said disc or collar 31 being capable of endwise movement but held from free rotation on the axle by pins 32 carried by the arm 24.

Between the opposite side of the disc or collar 31 and the arm 24 a covered elastic endless ring $1^g$ is arranged so as to be subject to compression when, by relative turning of the arms or levers, the inclines or cams acting upon the movable disc 31 shift the latter on the axle 29. This compression of the ring provides the necessary cushioning effect between the arms or levers, and consequently enables these members to yieldingly control the parts of the vehicle to which they are connected.

Dependent upon particular requirements, the ring $1^g$ may, in the normal condition of the device, be either with or without an initial compression between the compressing elements. For example, the axle 29 may consist of a bolt or stud furnished with a nut 33, by the tightening of which the desired compressive action upon the ring may be obtained. The nut may be locked in position by a split pin 34.

A development of the application of the invention described with reference to Figure 3 is illustrated in Figure 6 in connection with the landing gear of an aeroplane which includes a wheel 35 at each end of an axle 36. In this instance there is provided at each end of the axle a shock absorbing device including several covered rings $1^h$ which at one end is provided with a bearing 37 for the axle and at the other end is connected to the fuselage or body 38 of the machine. The bearing 37 is formed on or attached to a sleeve 39 in the box 40 of which there fits slidably one end of a rod 41 which extends through the rings $1^h$ and is pivotally attached at 42 to the fuselage. The rings are arranged between a flange 43 on the sleeve 39 and a washer or collar 44 on the rod 41 and are separated by metal washers 45.

It will be understood that when the aeroplane lands relative movement occurs between the bearing 37 and the rod 41, according to the load, and consequently the rings $1^h$ are compressed and absorb the shock.

A split case 46 may be provided for the rings $1^h$, said case being attached at one end to the sleeve 39, and at the other end to a collar 47 slidable on the rod 41.

A shock absorbing ring of the kind concerned by this invention is represent in Figure 11 and comprises a multi-thread rubber core 48 having a covering 49 of textile threads, tape or other pliable material.

The formation of the covering about the rubber core is an important feature since the covering controls the core and enables full advantage to be taken of the resiliency of the rubber. It is important that the covering be applied in such a manner as to avoid gaps or spaces therein through which the rubber might exude when the article is subjected to compression.

When covered elastic cord is employed as the resilient medium this may be arranged about or held by suitable anchorages which permit the cord to be acted upon compressively by associated members for the intended purpose. One or more lengths of the cord may be used according to circumstances.

It should be understood that several of the figures of the accompanying drawings, for example Figures 1, 3, 4, 5, 6 and 7, are more or less diagrammatical representations of applications of the invention and are not intended to show constructional details, which latter may be of different forms suitable for the purpose. For example, the cylinders 2, 12 and 16 may have removable ends or be otherwise constructed to permit insertion of the pistons and covered cores, and in conjunction with the utilization of covered rubber cores means of appropriate form may be adopted for maintaining proper relation between those parts of the vehicle or other body which are insulated from shock by the elastic medium. In some cases the housing or elements between which the covered core or cores is or are compressed may serve partly or wholly for this purpose.

What we claim then is:—

In a shock absorber, a resilient member subject to shock and consisting of an endless rubber ring having a core composed of a plurality of rubber strands, and a casing composed of substantially non-stretchable textile material, said member being arranged and adapted to respond to compressive strain in one direction without correlative expansion or distortion in other directions.

In testimony whereof we affix our signatures.

GODFREY LEVESON BROOKE-HUNT.
LEONARD ROWLAND.